(No Model.)

W. N. EYSTER.
BICYCLE.

No. 320,917. Patented June 30, 1885.

WITNESSES:
Harry Frease
Edwin F Frease

INVENTOR
William N. Eyster
BY
Fred W Bond
ATTORNEY

UNITED STATES PATENT OFFICE.

WILLIAM N. EYSTER, OF CANTON, OHIO.

BICYCLE.

SPECIFICATION forming part of Letters Patent No. 320,917, dated June 30, 1885.

Application filed April 6, 1885. (No model.)

*To all whom it may concern:*

Be it known that I, WILLIAM N. EYSTER, a citizen of the United States, residing at Canton, in the county of Stark and State of Ohio, have invented certain new and useful Improvements in Bicycles; and I do hereby declare that the following is a full, clear, and exact description of the same, reference being had to the annexed drawings, making a part of this specification, and to the letters and figures of reference marked thereon, in which—

Figure 1:
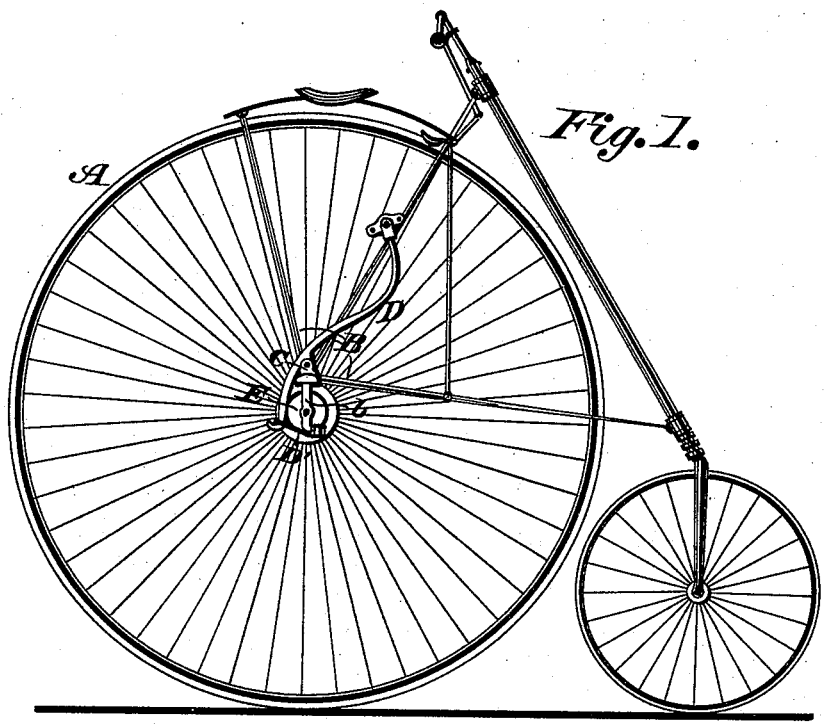
Figure 2:
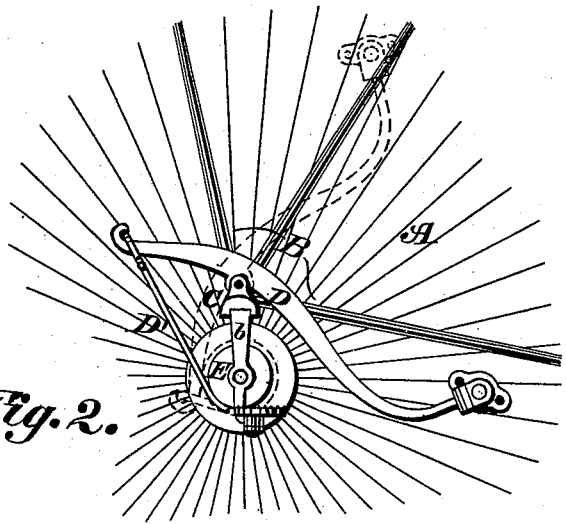

Figure 1 is a side elevation of a bicycle, showing propelling device. Fig. 2 is an enlarged view of propelling device.

The present invention has relation to the propelling of bicycles; and its nature consists in the different parts and combination of parts hereinafter described, and particularly pointed out in the claim.

Similar letters indicate corresponding parts in each figure of the drawings.

In the accompanying drawings, A represents the propelling-wheel, which is substantially of the form shown in Fig. 1, and is constructed in the ordinary manner of constructing wheels provided with a drum, ratchet, and spring. This wheel A is held in proper position by means of the frame b, said frame being provided with the arms B, to which arms are attached the saddle, guide bar or handle, and other devices used in bicycles of this class. The frame b is provided with the top extension, C, which may be formed with the frame; or it may be made separate and attached by suitable clamping-bolts. The tread lever or arm D is substantially of the form shown in the drawings, and is fulcrumed to the extension C, substantially as shown, the tread end of said lever or arm being about twice the length of the strap end. The strap D' is attached to the tread lever or arm D, as shown, the opposite end of said strap being attached to the periphery of the drum E.

It will be seen that by my peculiar arrangement I am enabled to gain leverage over a tread lever or arm fulcrumed at its end. I am aware that tread-levers as applied to bicycles and fulcrumed at the end are old, and hence do not claim broadly; but What I do claim as new, and desire to secure by Letters Patent, is—

In a bicycle, the combination of the frame b, provided with a suitable step and having the top extension, C, of the tread lever or arm D, fulcrumed to said top extension and directly over the axle, and of the strap D' and the drum E, all arranged substantially as shown and described, and for the purpose set forth.

In testimony that I claim the above I have hereunto subscribed my name in the presence of two witnesses.

WILLIAM N. EYSTER.

Witnesses:
 EDWIN F. FREASE,
 FRED W. BOND.